May 4, 1937. J. W. PAGE 2,079,384

CHAIN LINK

Filed May 27, 1936 3 Sheets-Sheet 1

Inventor:
John W. Page,
By Dynforth, Lee, Chritton & Wiles,
Attys.

May 4, 1937. J. W. PAGE 2,079,384
CHAIN LINK
Filed May 27, 1936 3 Sheets-Sheet 2
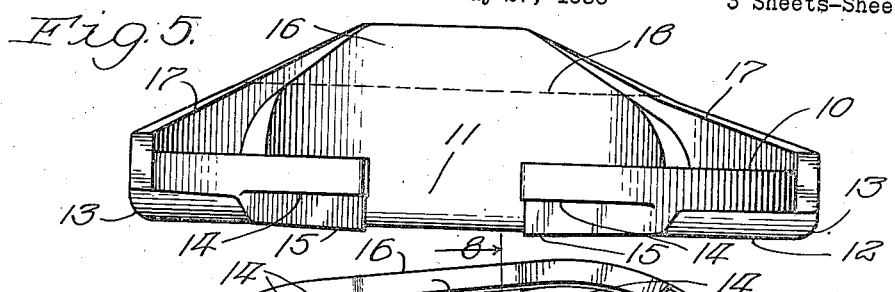
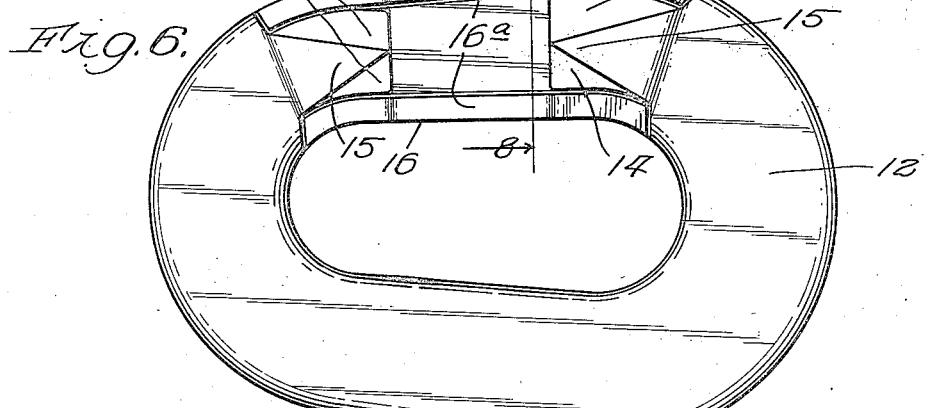
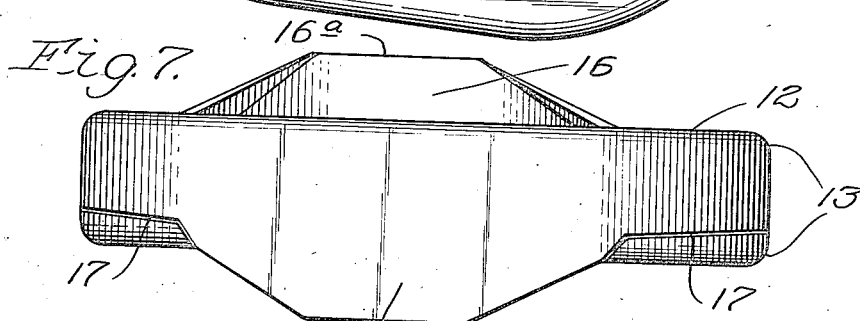
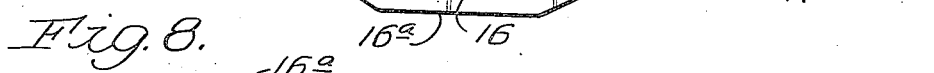
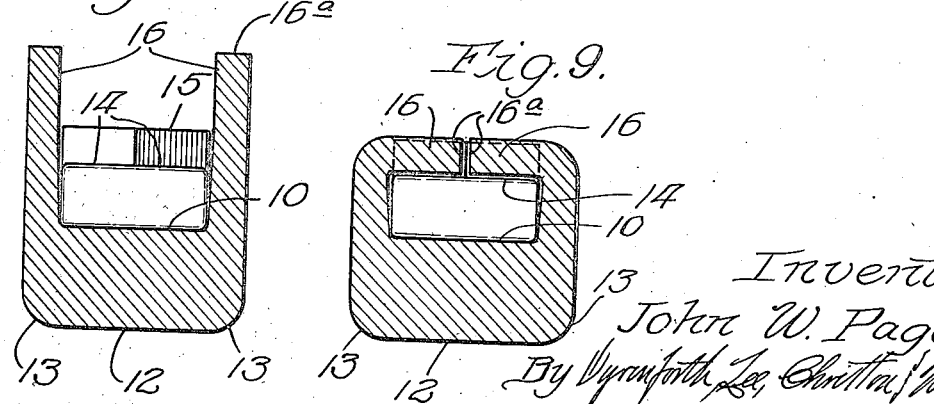
Inventor.
John W. Page,
By Wynnforth Lee, Chritton & Wiles,
Attys May 4, 1937. J. W. PAGE 2,079,384
CHAIN LINK
Filed May 27, 1936 3 Sheets-Sheet 3
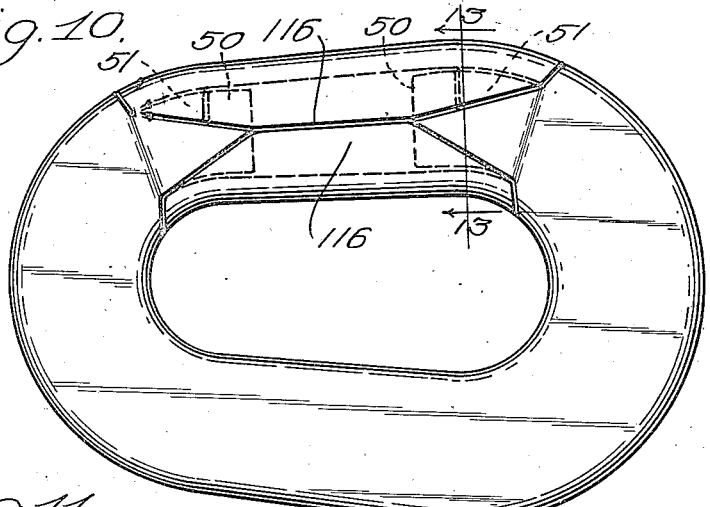
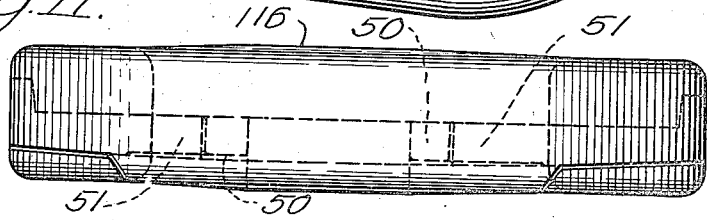
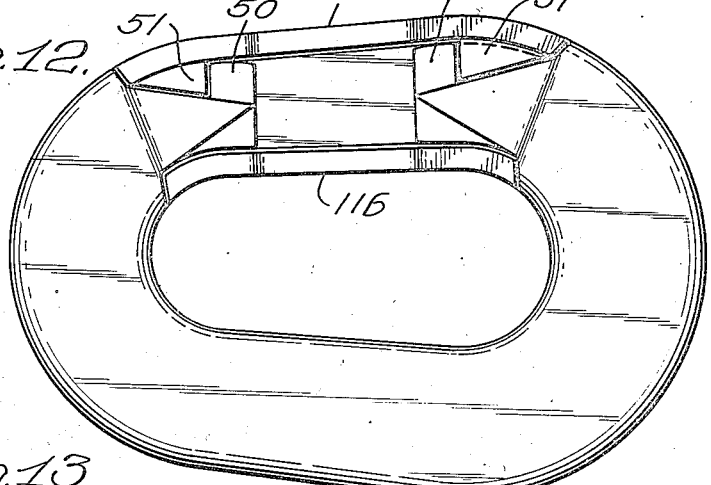
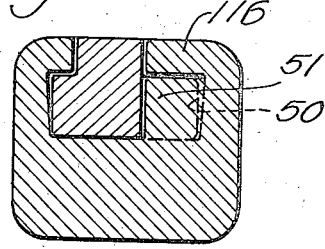
Inventor:
John W. Page,
By Dynnforth, Lee, Chritton & Wiles,
Attys.

Patented May 4, 1937

2,079,384

UNITED STATES PATENT OFFICE 2,079,384

CHAIN LINK

John W. Page, Chicago, Ill., assignor to Page Engineering Company, Chicago, Ill., a corporation of Illinois Application May 27, 1936, Serial No. 82,116

4 Claims. (Cl. 59—84)

This invention relates to improvements in chain links and, more especially, a two-part link adapted for easy and quick assembly. The invention may be utilized, for example, in the making of a repair link, or a link that is normally open and which may be readily closed. The invention may be used, for example, in making links adapted to be closed in the field by the use of simple instruments.

In general, my invention includes two substantially C-shaped members adapted to be superimposed with the openings oppositely arranged. Because of the opening in each member, the same may be easily linked into the ends of chains, eyes, rings, bails, and the like. Each member has portions adapted to be bent toward each other to engage the ends of the other member to hold the members together to form a complete closed link. When the link is closed, it is neat in appearance, strong and durable and may function substantially as well as an ordinary integrally formed chain link. If desired, of course, an entire chain may readily be formed of links embodying the present invention.

Other features and advantages of my invention will appear more fully as I proceed with my specification.

In that form of device embodying the features of my invention shown in the accompanying drawings—

Figure 1:
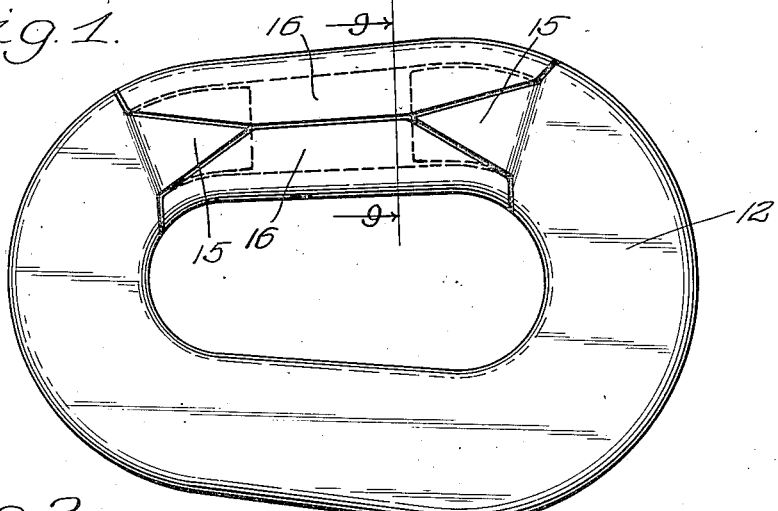
Figure 2:
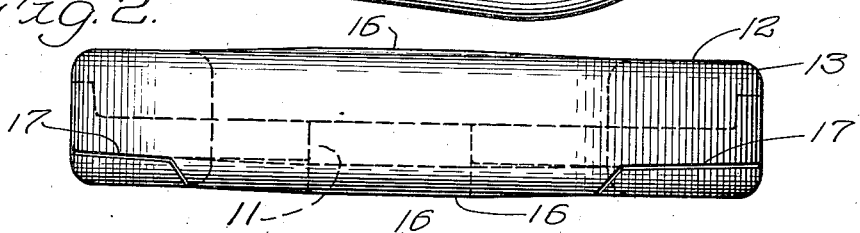
Figure 4:
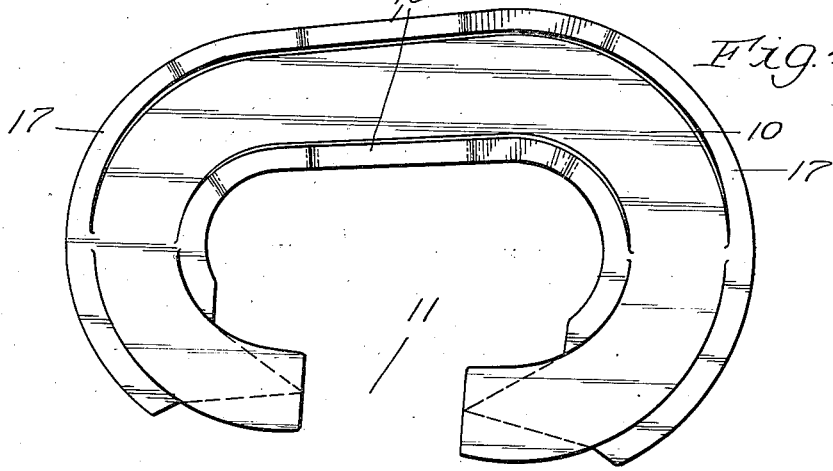
Figure 3:
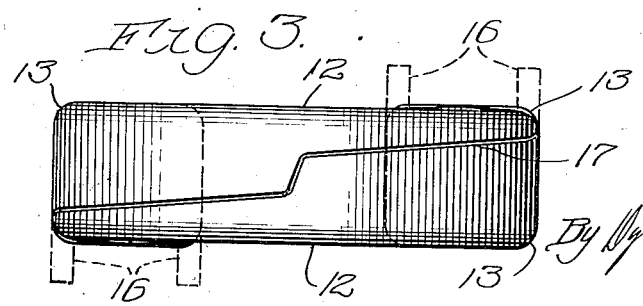

Figure 1 is a top plan view showing the link closed; Fig. 2 is a similar view in side elevation; Fig. 3 is a view in end elevation; Fig. 4 is a top plan view of one of the members forming the link; Fig. 5 is a view of said member in side elevation; Fig. 6 is a top plan view of the two members of the link superimposed showing the same before the bendable portions on either member have been bent toward each other to engage the ends of the other member to hold the members together; Fig. 7 is a similar view in side elevation; Fig. 8 is a view taken as indicated by the line 8 of Fig. 6; Fig. 9 is a view taken as indicated by the line 9 of Fig. 1; Fig. 10 is a view similar to Fig. 1, showing a modification; Fig. 11 is a view similar to Fig. 2, showing the same modification; Fig. 12 is a view similar to Fig. 6, showing the same modification; and Fig. 13 is a view taken as indicated by the line 13 of Fig. 10.

As shown in the drawings, the complete link includes two substantially C-shaped members adapted to be superimposed with the openings oppositely arranged. One of the C-shaped members is shown alone in Fig. 4 and in Fig. 5. Each member on one side has a substantially flat surface 10 adapted to lie against the corresponding surface of the other member when the two are superimposed. 11 indicates the opening in the member. When the two members are superimposed, as shown in Figs. 1 and 2, these openings are oppositely arranged. That is, the solid or shank portion of each C-shaped member lies over and bridges the opening in the other member.

Opposite the flat side 10, each of the members has an outer surface or side 12 with rounded corners 13 so that when the two members are placed together to form the complete link, its cross-section will be substantially square with four rounded corners, as shown in Fig. 9.

The ends of each member on the outer side are cut away or thinned, as indicated by 14, 14, to leave V-shaped shelves 15 at the ends adjacent the opening. Each member on the inner side opposite the opening is provided with bendable wing portions 16, 16, adapted to be bent toward each other to engage the ends of the other member to hold the two members together. The entire link is preferably made of more or less malleable, pliable or bendable metal so that the wing portions 16, 16, will also be malleable or bendable.

In the practice of the invention, the two halves are placed with their flat sides together and the openings opposite each other. The two members are shown in this position in Figs. 6, 7 and 8. The wing members 16, 16, on each member are then bent downwardly toward each other and are so shaped that they will fit into the recesses 14, 14, and thus clamp or engage the ends of the other member to hold the two parts of the link tightly together. The wing portions 16 have their ends beveled to fit the V-shaped shelves 15 and the edges 16ᵃ of the central portions of the wings 16 are adapted to come substantially together so as to form a smooth surface for the link when it is closed. The thickness of the portions 16 is substantially equal to the depth of the depression 14. When the link is assembled, as shown in Figs. 1 and 2, its outer surface on both sides will be substantially smooth and free from deformities.

In Fig. 3, the two links are shown together with the wings 16 shown bent down in solid lines, the broken lines showing such wings as they appear after the two parts of the link have been placed together before engagement. Fig. 8 shows the wings 16, 16, before bending the same together and Fig. 9 is a similar view showing the wings bent together.

The wings 16 are preferably extended some distance around each link member toward the point where they are bent, as indicated by 17, and the opposite member is provided with a recess to receive the same. In Fig. 5, the dotted line 18 indicates substantially the line of bend for the wing or ear 16.

In Figs. 10 to 13, I have shown a modified form. As here shown, the members are provided with interlocking parts to prevent the ends of one member from pulling out of the other longitudinally under strain. For example, the ends of the C-shaped members may be provided with lugs 50, 50 interlocking with lugs 51, 51 on the other member when the two members are superimposed. In other respects, the construction is substantially the same as described above. When the two parts are assembled, the wing portions 116, 116 corresponding to the wing portions 16, 16 in the other form are bent down as shown in Fig. 10, to complete the formation of the link. When these wing portions are bent down into position, the lugs 50 and 51 are covered.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new and desire to secure by Letters Patent, is:

1. A chain including, two substantially C-shaped members adapted to be superimposed with the openings oppositely arranged, the ends of each member on the outside being recessed to leave substantially V-shaped shelves, and two bendable ear portions on each member opposite the opening, said portions on each member adapted to be bent down toward each other to engage the ends of the other member to hold said members together, said ear portions adapted to fit in said recesses on said ends and provided with slanting ends adapted to abut against said V-shaped shelves, and the center edge portions of said ear members adapted to abut substantially against each other when said ear members are bent down toward each other to hold the link members together.

2. A chain link, including, two substantially C-shaped members adapted to be superimposed with the openings oppositely arranged, each member having a portion adapted to be bent to engage the ends of the other member, to hold said members together, the ends of each member being provided with recesses adapted to accommodate said bent portions, said recesses leaving V-shaped shelves on said ends, the bent portions being provided with slanting edges adapted to abut against said shelves.

3. A chain link including, two substantially C-shaped members adapted to be superimposed with the openings oppositely arranged, each member having portions adapted to be bent to engage the ends of the other member to hold said members together, the ends of each member being provided with recesses adapted to accommodate said bent portions, said recesses leaving V-shaped shelves on said ends, the bent portions being provided with slanting edges adapted to abut against said shelves.

4. A chain link including, two substantially C-shaped members adapted to be superimposed with the openings oppositely arranged, each member having portions adapted to be bent toward each other to engage the ends of the other member to hold said members together, the ends of each member being provided with recesses adapted to accommodate said bent portions, said recesses leaving V-shaped shelves on said ends, the bent portions being provided with slanting edges adapted to abut against said shelves.

JOHN W. PAGE.